United States Patent
Baker et al.

(10) Patent No.: US 10,157,196 B2
(45) Date of Patent: Dec. 18, 2018

(54) INTRA-PLATFORM DATA MIGRATION (71) Applicant: salesforce.com, inc., San Francisco, CA (US)

(72) Inventors: David Ross Baker, San Francisco, CA (US); Mitul J. Hirpara, Sunnyvale, CA (US); Michael Gonzales, Castro Valley, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 369 days.

(21) Appl. No.: 14/825,073

(22) Filed: Aug. 12, 2015

(65) Prior Publication Data

US 2017/0046373 A1 Feb. 16, 2017

(51) Int. Cl.
*G06F 17/30* (2006.01)

(52) U.S. Cl.
CPC ...... *G06F 17/30345* (2013.01); *G06F 17/303* (2013.01)

(58) Field of Classification Search
CPC .................................. G06F 17/30345
USPC .................................. 707/609, 626
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Formukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| 6,367,077 B1 | 4/2002 | Brodersen et al. | |

(Continued)

*Primary Examiner* — Chelcie Daye (74) *Attorney, Agent, or Firm* — Schwabe Williamson & Wyatt (57) ABSTRACT

A data migration system and method operate within a database platform system, which includes first and second databases, to provide data migration between databases. The data migration includes automatically generating a globally unique identifier for each record of the first database, such as upon creation of each record. Records in the second database are updated or inserted according to whether or not records in the second database have globally unique identifiers that correspond to globally unique identifiers of records in the first database.

20 Claims, 5 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,700,569 B1 * | 4/2014 | Wilson .................. G06F 17/303 |
| | | 707/626 |
| 9,514,164 B1 * | 12/2016 | Matic ................ G06F 17/30371 |
| | | 707/609 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla et al. |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |

(56) References Cited

U.S. PATENT DOCUMENTS

2014/0067810 A1\* 3/2014 Wisnovsky ....... G06F 17/30584
 707/737
2014/0359537 A1 12/2014 Jakobson et al.
2016/0154839 A1\* 6/2016 Bezawada ......... G06F 17/30371
 707/692

\* cited by examiner

INTRA-PLATFORM DATA MIGRATION

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to data migration between databases of a database platform system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

In some operations of databases in a database platform system, the data or records in one database are conformed to the data or records in another database. Typically, identifying and updating changes in the data from one database to another can be complex and time consuming.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

A database system might display a case associated with a customer support query. The database system may initiate a search for other cases related to the new case. The database system may extract relevant terms from the title and/or description provided in the new case using a term weighting algorithm, such as more like this (MLT). The relevant terms are then used in a search query for identifying the related cases.

The database system identifies articles linked to the related cases, ranks the articles, and causes the articles to be displayed on a remote user system in an order based on the ranking. The database system may rank the articles based on a number of related cases linked to the articles. The database system also may rank the article based on other parameters, such as relevancy scores for the related cases, labels assigned to the cases, last modified dates of the related cases, etc.

The database system may identify more relevant articles by first finding related cases that use a similar vocabulary to describe similar customer problems. The database system then identifies the articles that were previously determined to help resolve the prior problems. Thus, the database system may bridge the gap between vocabularies used by customers to describe problems and vocabularies used in articles to describe solutions to those problems.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by Salesforce.com, Inc. of San Francisco, Calif. Salesforce.com, Inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by Salesforce.com, Inc. and can be implemented in the context of various other database systems such as cloud-based systems that are not part of a multi-tenant database system or which do not provide enterprise social networking services.

I. Example System Overview

Figure 1A:
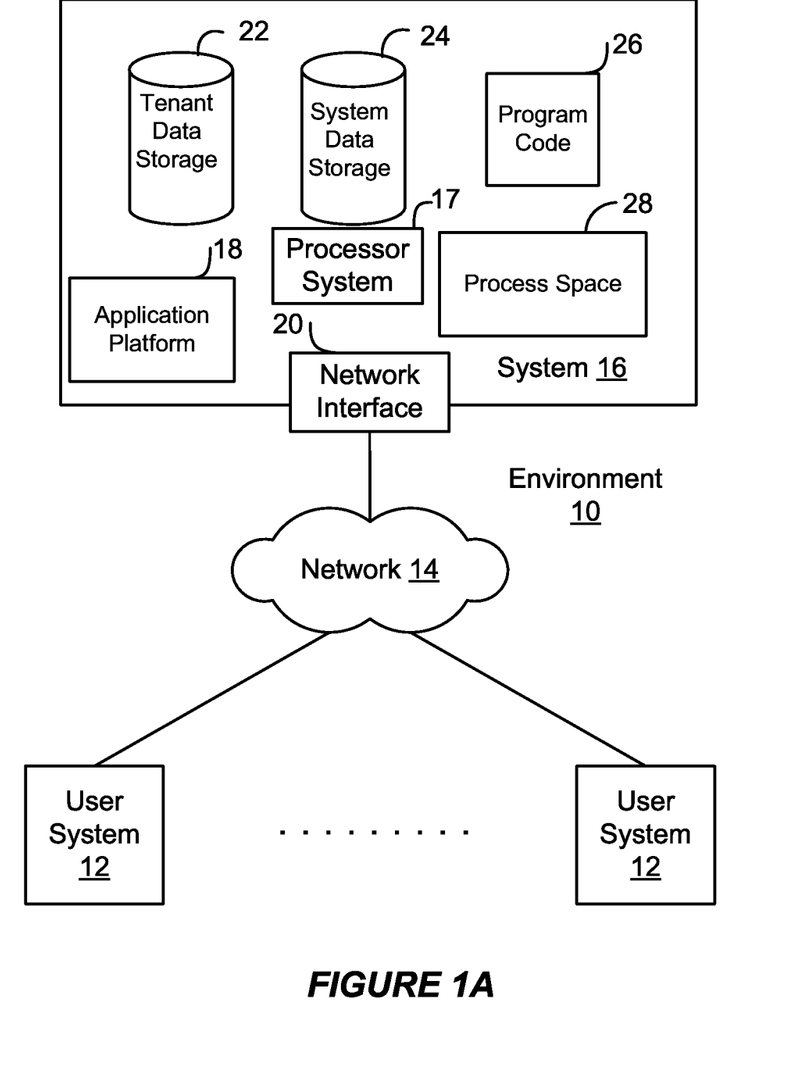
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system or platform 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
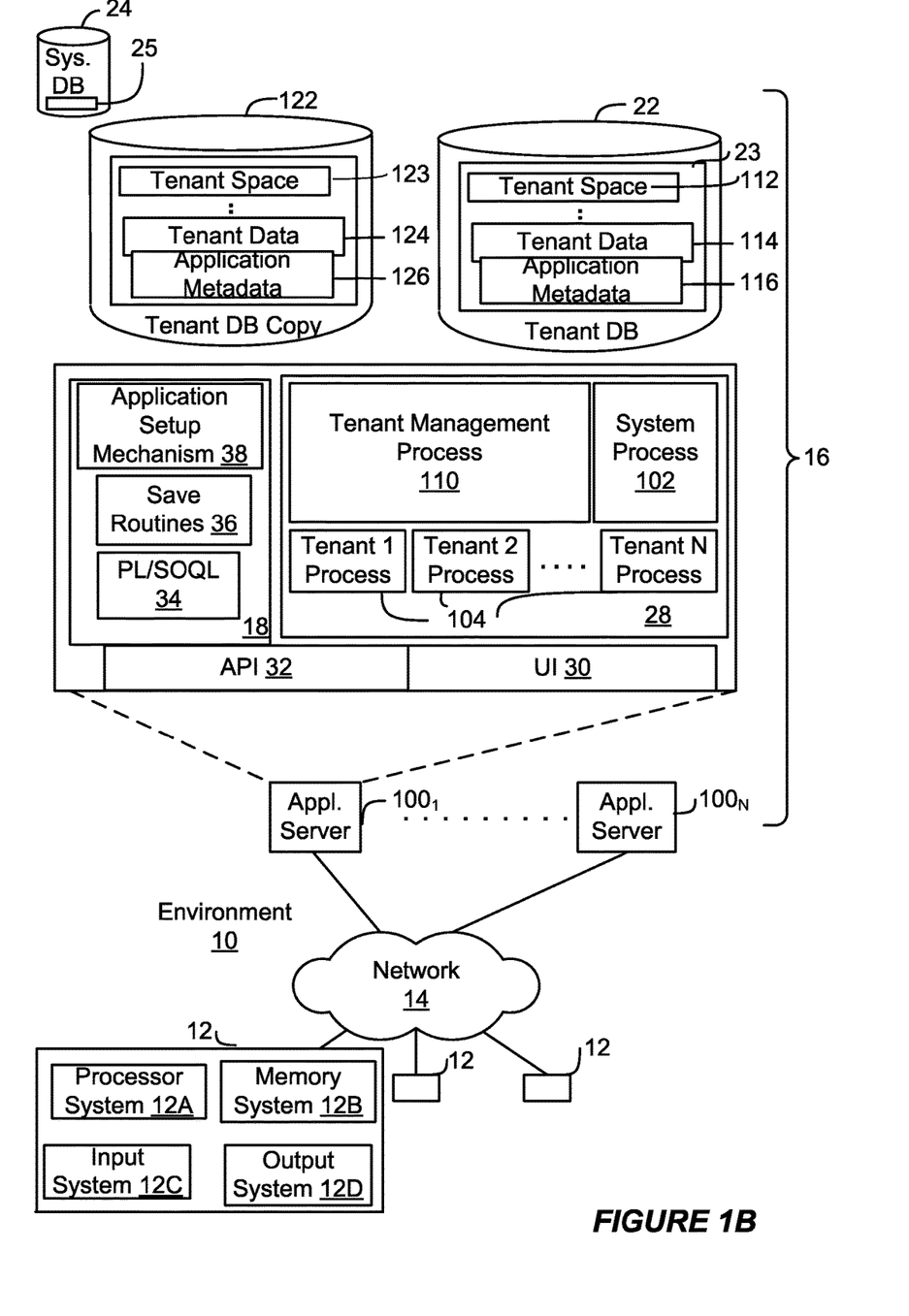
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 1B also illustrates an isolated tenant development space or "sandbox" 120 having a tenant database copy 122 of tenant database 22, including tenant space copy 123, tenant data copy 124 and an application metadata copy 126 of tenant space 112, tenant data 114 and application metadata 116, respectively. Tenant development space or "sandbox" 120 is isolated in that it is not actively in use or accessed by database system 16 so as to provide an environment for development and testing of tenant data, objects, content, etc., without compromising the tenant database 22 in use by database system 16. Tenant database copy 122 may at one time be identical to tenant database 22, but may change according to tenant data, objects, content, etc., that are developed and tested. Tenant database copy 122 may be updated over time with changes made in tenant database 22 or may have new data added directly from within tenant development space 120. Development or testing in tenant development space 120 may result in objects, records, or data (referred to as records) in tenant data copy 124 and application metadata copy 126 to be incorporated into tenant database 22.

II. Dynamic Intra-Platform Data Migration

Figure 2:
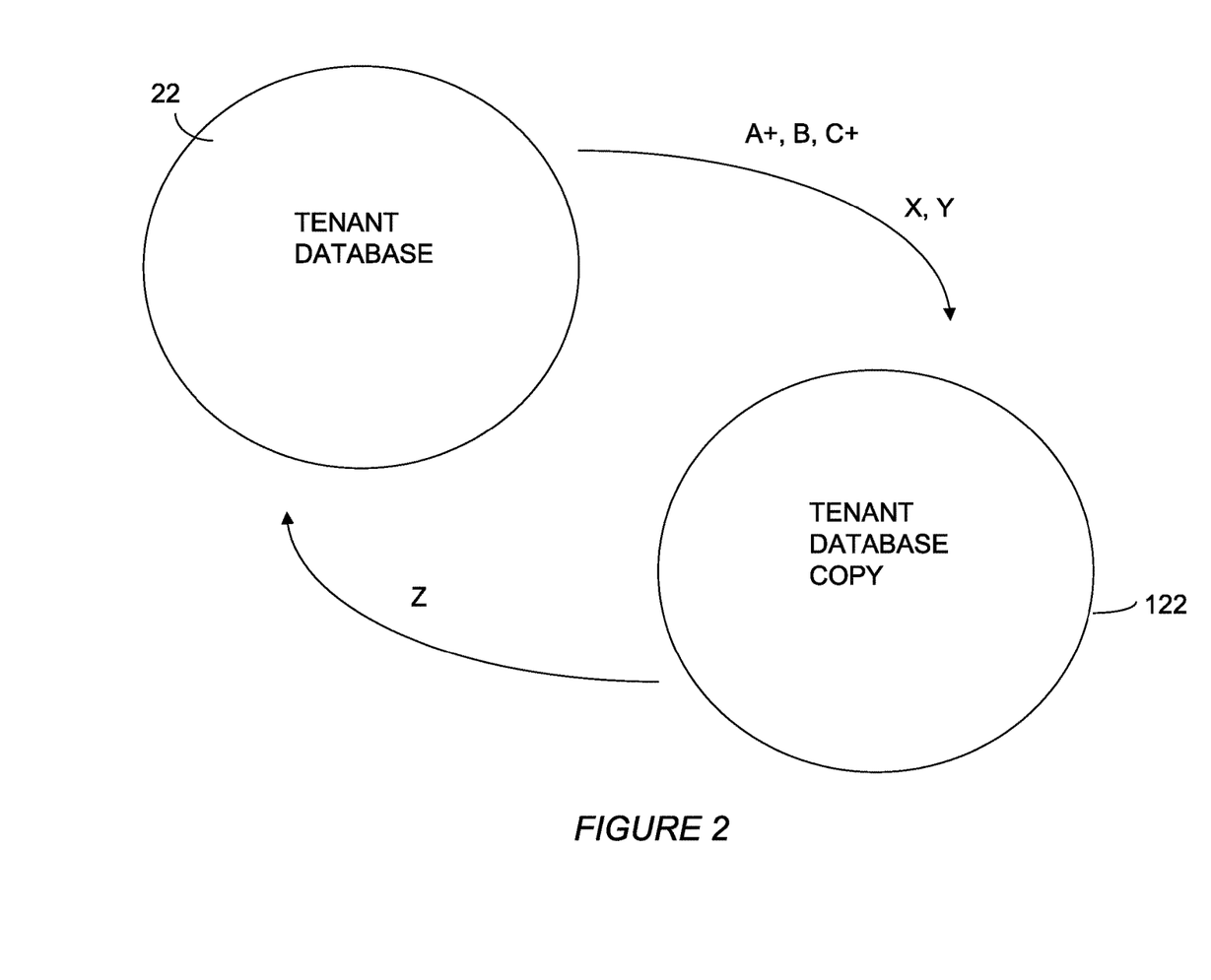
FIG. 2 illustrates examples of changes between tenant database and a tenant database copy.

FIG. 2 illustrates examples of changes between tenant database 22 and tenant database copy 122. For example, tenant database copy 122 may at first substantially correspond to tenant database 22, as represented by records A, B, C. (It will be appreciated that tenant database 22 would typically include an arbitrary number of records and that records A, B, and C are merely a simplified representation.) During use of tenant database copy 122 in tenant development space 120, and after initial creation of tenant database copy 122, records in tenant database 22 may be augmented or otherwise changed (as represented by the symbol "+") and new records may be created, as represents by records X and Y. In addition, records in tenant database copy 122 may be augmented or otherwise changed and new records may be created, as represents by record z, for incorporation into tenant database 22. Incorporating data between tenant database 22 and tenant database copy 122 illustrate examples of intra-platform data migration. Moreover, it will be appreciated that intra-platform data migration may be performed between tenant databases other a tenant database copy 122 in tenant development space 120.

Figure 3:
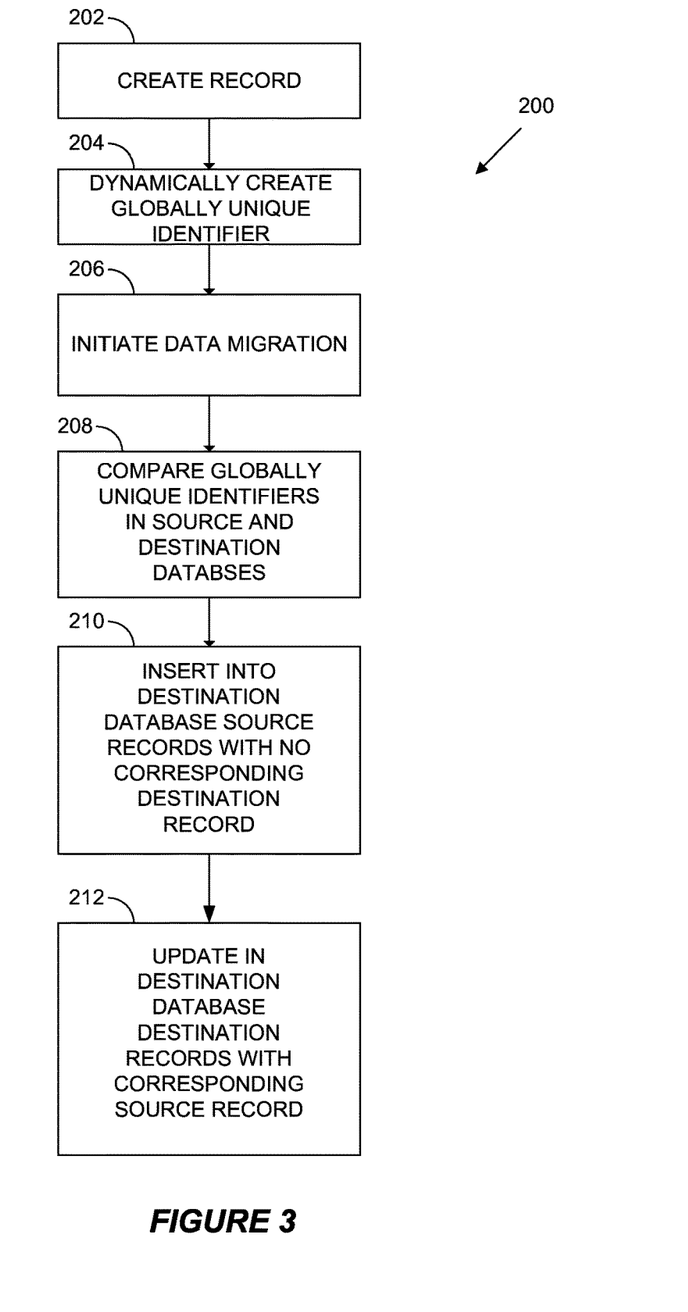
FIG. 3 shows a dynamic intra-platform data migration process according to some implementations.

FIG. 3 shows a dynamic intra-platform data migration process 200 according to some implementations. For purposes of illustration, data migration process 200 is described with reference to data migration between first and second tenant databases, such as from tenant database 22 to tenant database copy 122. It will be appreciated, however, that data migration process 200 may be utilized or implemented in connection with data migration between any two or more tenant databases of a multi-tenant database system 16, whether or not any of the tenant databases is associated with a tenant development space.

In operation 202, a record of a tenant database is created.

In operation 204 a globally unique identifier is dynamically associated with each record of a tenant database. For example, the globally unique identifier may be associated with or incorporated into a field of each record automatically upon creation of the record. In one implementation, an abstract class may be called upon creation of each record to provide the globally unique identifier.

For example, the globally unique identifier may include or utilize a record identifying attribute that is unique within the tenant database, such as ExternalID employed in database services provided by Salesforce.com, Inc., the assignee of the present invention, together with an additional identifying setting that identifies the data source (e.g., OrgName or TenantName), so that the two identifiers together uniquely identify the record. An identifying setting that identifies the data source (e.g., OrgName or TenantName) may be implemented as a prefix to another identifier, such as ExternalID, and is beneficial in identifying the data source. Alternatively, the globally unique identifier may be associated with each record dynamically at any time after creation, such as in preparation for or as an operation precedent to migration. It will be further appreciated that any manner of globally unique identification may be used.

In operation 206 a data migration from a source tenant database to a destination tenant database is initiated (e.g., from tenant database 22 to tenant database copy 122).

In operation 208 globally unique identifiers of records in the source tenant database ("source records") are compared to globally unique identifiers of records the destination tenant database ("destination records"). Globally unique identifiers of source records that do not correspond to globally unique identifiers of destination records represent source records that are not present in the destination tenant database. Globally unique identifiers of source records that do correspond to globally unique identifiers of destination records indicate source records in the source tenant database that correspond to destination records in the destination tenant database.

In operation 210 source records in the source tenant database that do not correspond to destination records in the destination tenant database are inserted or added into the destination tenant database.

In operation 212 source records in the source tenant database that correspond to destination records in the destination tenant database are updated in the destination tenant database. In one implementation, updating a destination record in the destination database includes identifying one or more fields in the destination record that do not match corresponding fields in the source record and conforming the identified one or more fields in the destination record to the corresponding fields in the source record.

Records are updated or inserted according to whether the globally unique identifier of the source record in the source tenant database corresponds to the globally unique identifier of a destination record in the destination tenant database. A record is updated if the globally unique identifier of a source record in the source tenant database corresponds to the globally unique identifier of a destination record in the destination tenant database. A record is inserted into the destination database if the globally unique identifier of a source record in the source tenant database does not correspond to the globally unique identifier of a destination record in the destination tenant database. The operation of inserting and updating records between a source tenant database and a destination tenant database are sometimes together referred to as "upserting."

Figure 4:
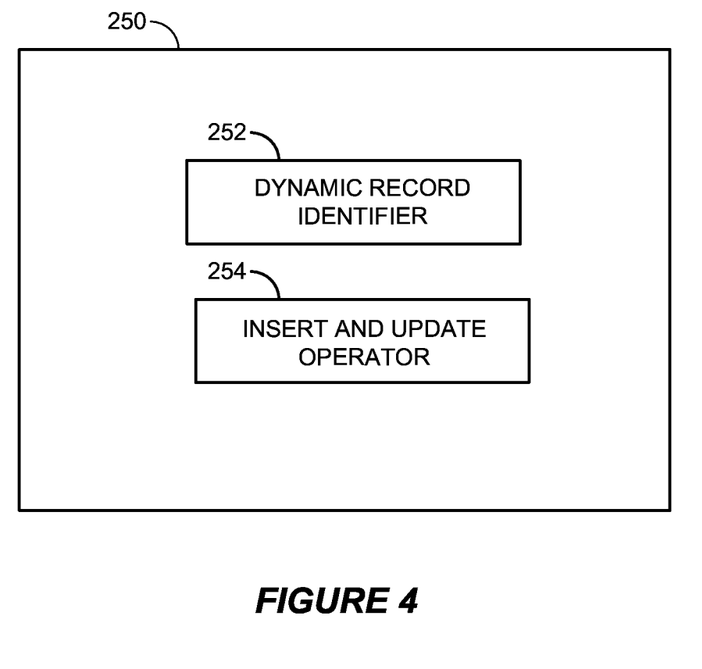
FIG. 4 shows a dynamic intra-platform data migration system that provides data migration between any two or more tenant databases of a multi-tenant database system.

FIG. 4 shows a dynamic intra-platform data migration system 250 that provides data migration between any two or more tenant databases of a multi-tenant database system 16, whether or not any of the tenant databases is associated with a tenant development space. Data migration system 250 includes a dynamic record identifier 252 that generates a globally unique identifier for each record of a tenant database dynamically or automatically upon creation of the record. In one implementation, dynamic record identifier 252 may operate as an abstract class that is called or triggered upon creation of each record. As described in reference to data migration process 200, the globally unique identifier may include or utilize a record identifying attribute that is unique within the tenant database, such as ExternalID, together with an additional identifying setting that identifies the data source (e.g., OrgName or TenantName), so that the two identifiers together uniquely identify the record. Alternatively, any manner of globally unique identification may be used.

An update and insert operator 254, sometimes referred to as upsert operator 254, updates or inserts records in a tenant destination database according to whether corresponding records in a source tenant database are present or not, respectively. Upsert operator 254 compares the globally unique identifiers of records in the source tenant database to globally unique identifiers of records in the destination tenant database to determine whether the destination tenant database includes records corresponding to those in the source tenant database.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database (DB) platform system that includes first and second DBs having respective first and second records, the system comprising:
a processor; and
a memory to store one or more sequences of instructions which, when executed by the processor, cause the processor to:
automatically associate a globally unique identifier (GUID) with each record of the first DB, the GUID of each record comprises a record identifying attribute combined with a data source identifier, the record identifying attribute uniquely identifies a record within the first DB or the second DB, and the data source identifier identifies a source of the record within the first DB or the second DB;
compare GUIDs of records in the first DB to GUIDs of records the second DB;
insert into the second DB first records from the first DB for which no second records in the second DB have corresponding GUIDs;
update in the second DB, in response to insertion of the first records into the second DB, second records for which first records in the first DB have corresponding GUIDs;

insert at least one second record of the second DB into the first DB when a GUID of the at least one second record does not exist in the first DB; and update at least one first record in the first DB with data of the at least one second record of the second DB when the GUID of the at least one second record does exist in the first DB.

2. The system of claim 1, wherein, to update the second record in the second DB, execution of the one or more sequences of instructions is to cause the processor to:

identify one or more fields in the second record that do not match corresponding fields in the first record; and conform the one or more fields in the second record to the corresponding fields in the first record.

3. The system of claim 1, wherein execution of the instructions is to cause the processor to generate the GUID automatically for each record of the first DB upon creation of each record.

4. The system of claim 1, wherein the GUID is to be automatically associated with each record of the first DB upon creation of each record.

5. The system of claim 1, wherein one of the first and second DBs is a sandbox DB to operate within an isolated tenant development space of the DB platform system and the other one of the first and second DBs is a tenant DB, the sandbox DB being a copy of the tenant DB used for testing applications for accessing and manipulating tenant data in the tenant DB, and the isolated tenant development space being separate from general operation of the DB platform system.

6. The system of claim 1, wherein the DB platform system is to operate as a multi-tenant DB system, the first and second DBs are of a tenant of the multi-tenant DB system, and the record identifying attribute of the GUID is unique to a tenant of the multi-tenant DB.

7. A database (DB) platform method, the method comprising:

automatically associating, by a computing device, a globally unique identifier (GUID) with each record of a first DB of a DB platform, the GUID of each record comprises a record identifying attribute combined with a data source identifier, the record identifying attribute uniquely identifies a record within the first DB or the second DB, and the data source identifier identifies a source of the record within the first DB or the second DB;

comparing, by the computing device, GUID of records in the first DB to GUIDs of records a second DB in the DB platform;

inserting, by the computing device, into the second DB first records from the first DB for which no second records in the second DB have corresponding GUIDs;

updating, by the computing device, in the second DB second records for which first records in the first DB have corresponding GUIDs;

inserting, by the computing device, at least one second record of the second DB into the first DB when a GUID of the at least one second record does not exist in the first DB; and updating, by the computing device, at least one first record in the first DB with data of the at least one second record of the second DB when the GUID of the at least one second record does exist in the first DB.

8. The method of claim 7, wherein updating a second record in the second DB comprises:

identifying, by the computing device, one or more fields in the second record that do not match corresponding fields in the first record; and conforming, by the computing device, the one or more fields in the second record to the corresponding fields in the first record.

9. The method of claim 7, wherein the method comprises generating, by the computing device, the GUID automatically for each record of the first DB upon creation of each record.

10. The method of claim 7, wherein the GUID is automatically associated with each record of the first or second DB upon creation of each record.

11. The method of claim 7, wherein one of the first and second DBs is a sandbox DB that operates within an isolated tenant development space of the DB platform and the other one of the first and second DBs is a tenant DB, the sandbox DB being a copy of the tenant DB used for testing applications for accessing and manipulating tenant data in the tenant DB, and the isolated tenant development space being separate from general operation of the DB platform.

12. The method of claim 7, wherein the DB platform operates as a multi-tenant DB and which the first and second DBs are of a tenant of the multi-tenant DB system.

13. A database (DB) platform system that includes first and second DBs having respective first and second records, the system comprising:

a processor; and a memory to store one or more sequences of instructions of a dynamic record identifier and one or more sequences of instructions of an update and insert operator, wherein:

the processor is to execute the one or more sequences of instructions of the dynamic record identifier to automatically generate a globally unique identifier (GUID) for each record of the first DB, the GUID of each record comprises a record identifying attribute combined with a data source identifier, the record identifying attribute uniquely identifies a record within the first DB or the second DB, and the data source identifier comprises identifies a source of the record within the first DB or the second DB;

the processor is to execute the one or more sequences of instructions of the update and insert operator to:

update or insert records in the second DB according to whether corresponding records in the first DB are present or not, respectively;

insert at least one second record of the second DB into the first DB when a GUID of the at least one second record does not exist in the first DB; and update at least one first record in the first DB with data of the at least one second record of the second DB when the GUID of the at least one second record does exist in the first DB.

14. The system of claim 13, wherein the processor is to execute the one or more sequence of instructions of the update and insert operator to:

compare GUIDs of records in the first DB to GUIDs of records the second DB;

insert, into the second DB, first records from the first DB for which no second records in the second DB have corresponding GUIDs; and update in the second DB second records for which first records in the first DB have corresponding GUIDs.

15. The system of claim 13, wherein the dynamic record identifier is to generate the GUID automatically for each record of the first DB upon creation of each record.

16. The system of claim 13, wherein one of the first and second DBs is to operate within an isolated tenant development space of the DB platform system and the other one of the first and second DBs is a tenant DB, the sandbox DB being a copy of the tenant DB used for testing applications for accessing and manipulating tenant data in the tenant DB, and the isolated tenant development space being separate from general operation of the DB platform system.

17. The system of claim 13, wherein the DB platform system is to operate as a multi-tenant DB system, and the first and second DBs are of a tenant of the multi-tenant DB system.

18. The system of claim 14, wherein the processor is to execute the one or more sequence of instructions of the update and insert operator to:
instruct the dynamic record identifier to generate a GUID the first records from the first DB that are to be inserted into the second DB upon creation of the first records in the second DB.

19. The method of claim 7, further comprising:
comparing, by the computing device, GUIDs of records in the first DB to GUIDs of records the second DB;
inserting, by the computing device into the second DB, first records from the first DB for which no second records in the second DB have corresponding GUIDs;
generating, by the computing device, a GUID for the first records from the first DB that are to be inserted into the second DB upon creation of the first records in the second DB; and
updating, by the computing device second records in the second DB for which first records in the first DB have corresponding GUIDs.

20. The system of claim 1, wherein execution of the one or more sequences of instructions is to cause the processor to:
compare GUIDs of records in the first DB to GUIDs of records the second DB;
insert, into the second DB, first records from the first DB for which no second records in the second DB have corresponding GUIDs;
generate a GUID for the first records from the first DB that are to be inserted into the second DB upon creation of the first records in the second DB; and
update in the second DB second records for which first records in the first DB have corresponding GUIDs.

* * * * *